United States Patent [19]

Taylor

[11] 3,747,663
[45] July 24, 1973

[54] PRODUCTION OF MOULDS
[75] Inventor: Percey Ronald Taylor, Wrexham, United Kingdom
[73] Assignee: Monsanto Chemicals Limited, London, England
[22] Filed: Mar. 11, 1971
[21] Appl. No.: 123,377

[30] Foreign Application Priority Data
Mar. 20, 1970 Great Britain .................. 13,552/70

[52] U.S. Cl. ................................... 164/25, 164/45
[51] Int. Cl. ............................................. B22c 9/04
[58] Field of Search .................. 164/23, 24, 25, 26, 164/45, 34, 35, 36

[56] References Cited
UNITED STATES PATENTS

| 3,455,368 | 7/1969 | Shepherd | 164/26 X |
| 3,339,620 | 9/1967 | Krzyzanowski et al. | 164/24 |
| 3,426,834 | 2/1968 | Jacobs et al. | 164/26 X |

Primary Examiner—J. Spencer Overholser
Assistant Examiner—John E. Roethel
Attorney—Herbert B. Roberts, Roy J. Klostermann and Neal E. Willis

[57] ABSTRACT

This disclosure relates to a process for the production of a ceramic mould wherein a film-forming polymer is coated onto a pattern of polyurethane foam prior to the application of a ceramic composition.

3 Claims, No Drawings

PRODUCTION OF MOULDS

BACKGROUND OF THE INVENTION

1. Field of the Invention

This invention relates to a process for the production of refractory moulds for metal casting, in particular to a process using a pattern of polyurethane foam. It also relates to metal castings obtained using the process.

2. Description of the Prior Art

The disposable patterns used to produce refractory moulds such as ceramic shell moulds for casting small metal objects are often made of materials such as thermoplastic resins, wax or urea. However, patterns made in such materials above a certain size become impractically heavy, especially for the production of ceramic shell moulds, and the foundry industry has therefore investigated the use of various foamed plastics as pattern material.

Patterns made from polyurethane foam are satisfactory in many respects, but careful handling is necessary to avoid surface damage. If the surface of the foam pattern is bruised or torn, then the primary investment often penetrates the bruised or torn portion of the surface of the pattern and this gives rise to non-metallic inclusions in the casting. Furthermore, it is practically impossible to obtain a completely smooth, closed-cell structure over the entire surface of a polyurethane foam pattern as normally produced, and this tends to produce corresponding imperfections in the final casting.

SUMMARY OF THE INVENTION

These disadvantages of the conventional polyurethane foam pattern are overcome or minimized by the process of the present invention, which is an improvement over the known process of producing a ceramic mould by applying to a pattern of polyurethane foam at least one layer of a ceramic composition comprising a binder and a refractory, setting, drying and firing the mould, which improvement comprises coating the surface of the pattern with a film-forming polymer before applying said ceramic composition.

As well as improving the surface quality of castings produced using polyurethane foam patterns, it has been found that coating the pattern by the process of the invention results in improved dimensional stability of the mould and hence in improved dimensional reproducibility in the castings.

DETAILED DESCRIPTION OF THE INVENTION

Normally the film-forming polymer will be applied as a solution in an inert solvent, preferably by spraying, but possibly by brushing or dipping. Any inert solvent may be utilized. Examples of some of the solvents which may be used include esters, preferably esters of alkanoic or alkenoic acids such as formic acid, acetic acid and acrylic acid, such as ethyl formate, methyl acetate, ethyl acetate, isopropyl acetate, n-butyl acetate, amyl acetate, nonyl acetate, benzyl acetate, methyl acrylate, ethyl acrylate, n-butyl acrylate and the like, alcohols preferably alkanols such as ethanol, isopropanol, n-butanol, isobutanol, 2-ethylhexanol and the like, ketones preferably aliphatic ketones and cycloaliphatic ketones such as acetone, methyl ethyl ketone, ethyl butyl ketone, isophorone, mesityl oxide, cyclohexanone, methyl cyclohexanone and the like, ethers preferably aliphatic ether-ols and ethers such as di-n-butyl ether, dichloroethyl ether, 2-methoxyethanol, 2-ethoxyethanol and the like, hydrocarbons such as white spirit, hexane, tetrahydronaphthalene, cyclohexane, benzene and alkylbenzenes such as toluene, xylene, mesitylene, cumene and the like and chlorinated hydrocarbons preferably chlorinated aliphatic hydrocarbons such as trichloroethylene, ethylene dichloride, methylene dichloride and the like. The most preferred solvents are esters of alkanols with acetic acid.

The thickness of polymer film applied can vary, and more than one coating can be applied, but generally the thickness required to achieve the object of the invention is without significant effect on the dimension of the pattern i.e., well within the usual tolerance of ±0.005 inch per inch. Thus the coating may, for example, have a total thickness of from 0.0001 to 0.008 inches and preferably has a total thickness of from 0.0002 to 0.005 inches.

The film-forming polymer may be applied as a precursor, for example, the composition or solution applied may contain monomeric compounds which polymerize as the coating dries, or it may contain polymeric compounds which crosslink or polymerize further on drying. Any film-forming polymer may be utilized. It is preferred to use organic film-forming polymers and still more preferred to use synthetic organic film-forming polymers. Examples of some of these which may be used include styrene polymers and copolymers, esters and adducts thereof, styrene-butadiene copolymers, styrene-maleic anhydride copolymers; acrylic acid and methacrylic acid polymers and copolymers, esters thereof such as acrylic-styrene copolymers, polybutyl methacrylate, polymethyl acrylate, polymethyl methacrylate, polyvinyl chloride, polyvinylidene chloride polymers and copolymers; alkyd resins, modified alkyd resins such as styrene modified alkyds, maleic anhydride modified alkyds, cyclopentadiene modified alkyds; vinyl ester polymers and copolymers, such as vinyl acetate resins, ethylene-vinyl acetate resins, vinyl acetate-maleic anhydride resins; polyvinyl acetals such as polyvinyl formal and polyvinyl butyral; epoxide and modified epoxide resins and polyurethane surface coating compositions such as moisture curing polyurethane pre-polymer compositions.

Compositions comprising a film-forming polymer and an inert solvent are well known and are commercially available. Those listed in "Paint Trade Manual of Raw Materials and Plant 1970" published by Sawell Publications Ltd., London, pages 140–168, 174–209 and 212–218 and especially pages 188–190 which is incorporated herein by reference, can be used to coat the pattern by the process of the invention. Such commercially available compositions usually have a viscosity at 25°C. of from 0.2 to 400 poises, preferably from 5 to 60 poises.

The preferred coating compositions comprise an acrylic resin in an ester of acetic acid such as the ethyl ester. The composition sold under the name Nobecutane has been found to give satisfactory results.

The destructible pattern can be made from any of the types of polyurethane foam normally used for this purpose and should have the degree of rigidity normally used for the particular type of shape required. The patterns can be made in moulds using any of the conventional starting materials, blowing agents, catalysts, surfactants, mixers, stirrers and techniques, many of which are described in "Rigid Plastics Foams" by T.H. Ferrigno, published by Reinhold Publishing Corp., second edition, pages 1–206, which is incorporated herein by reference.

The method of building the refractory mould around the polyurethane foam pattern and casting the metal therein is well-established and any conventional procedure can be used.

These processes include the well known "lost wax" process and the shell moulding process. In the latter process a shell is formed around a fusible pattern (in this case, polyurethane) by coating it with a slurry of a powdered refractory and a binding agent, causing the slurry to gel, and removing the pattern by melting or burning it out, for example, as described in U.S. Pat. No. 3,455,368 which is incorporated herein by reference.

Any conventional binding agent may be employed, for example, those containing silica. Usually, the binding agent has a silica content of between 7 and 35 percent by weight. The binding agent is preferably a solution of a hydrolyzed organic silicate such as ethyl silicate, or a silica sol (that is to say a colloidal solution of silica). The silica content of the binding agent is very often between 10 and 30 percent by weight of the binding agent, for instance about 25 percent by weight.

Where the binding agent is one formed by hydrolysis of an organic silicate this can be orthosilicate but in practice is usually a condensed silicate, that is to say a mixture of polysilicates. Good results are obtained using an ethyl silicate or an isopropyl silicate, for example, a mixture of silicates prepared by the reaction of silicon tetrachloride with ethyl or isopropyl alcohol containing a small proportion of water. The commercial ethyl silicate sold under the name "Silester OS" ("Silester" is a registered trademark) is particularly useful. In use the silicate is hydrolyzed with up to 15 percent by weight of water in the presence of an acid, for instance hydrochloric acid, and a mutual solvent, for instance ethyl or isopropyl alcohol; the binding agent accordingly has an acid pH.

The binding agent can also be a silica sol, which can suitably be one containing perhaps 15 to 50 percent of silica by weight. Good results are obtained when the concentration of silica in the sol is within the range of from 20 to 40 percent by weight, particularly when the concentration is about 30 percent by weight. The aqueous silica sols containing about 30 percent by weight of silica which are commercially available under the names "Syton X30" and "Syton P" ("Syton" is a registered trade mark) are especially useful. Preferably the silica sol is acidified so that the binding agent has an acid pH.

A typical aqueous silica sol has an $SiO_2:M_2O$ weight ratio (where M is a metal, for instance sodium or potassium) between 40:1 and 500:1, for instance, between 60:1 and 300:1; preferably the range is between 80:1 and 150:1, for instance, about 100:1. The more useful aqueous silica sols (that is the sols employed prior to acidification) are those which in addition to having the characteristics referred to above contain less than 1.5 percent by weight of inorganic salts, for example, MCl or $M_2SO_4$ (where M is an alkali metal) or other salts, preferably less than 1 percent by weight of said salts or more desirably less than 0.3 percent by weight of such salts, also the more useful aqueous silica sols contain silica particles having a particle size in the range of from about 5 to about 250 millimicrons and preferably in the range of from about 10 to about 100 millimicrons. These particles being preferably spherical or substantially spherical although some particles may be joined together as doublets or triplets.

The standard refractory fillers can be employed in preparing a slurry with the binding agent. Suitable fillers are for instance refractory oxides and silicates, such as alumina, silica, sillimanite and zircon. Refractory materials of similar type are also employed in the production of the "stucco" that is normally applied to the coating of slurry before gelation takes place. For instance, dry refractory particles can be dropped onto the moist coating to form the "stucco."

The particle size of the refractory filler used in preparing the slurry is preferably less than 200 mesh, that is to say none of the powder is retained on a 200 mesh British Standard Sieve (B.S.S.), and preferably the refractory should contain a significant proportion, perhaps 50 to 75 percent of material of particle size less than 300 mesh. The slurry can be prepared simply by mixing the powdered refractory filler a little at a time with the binding agent. A slurry of suitable viscosity can, for example, contain between about 30 and about 90 parts of the binder per 100 parts by weight of the refractory filler, depending mainly on the type and state of subdivision of the filler.

The invention is illustrated by the following Example.

EXAMPLE

Two polyurethane patterns with the same shape and substantially the same surface condition were selected. Each had open pores along the parting line of the original half-moulds in which the patterns were made. One pattern was coated by spraying from an aerosol can, with a solution of an acrylic resin in acetic esters sold under the name Nobecutane.

A ceramic shell mould was then made around each pattern using six coatings; primary grade stucco being applied to the first three. The binding agent used was a silica sol for the primary investment and ethyl silicate for the remaining investments. The two moulds were then shockfired at 1,050°C to remove the patterns; less than three minutes were required. H.R.C. MAX, which had the analysis C, 0.19 percent; Mn, 0.73 percent; Si, 1.33 percent; Ni, 11.98 percent; Cr, 22.3 percent; W, 3.15 percent and Fe, 60.32 percent was cast in the two moulds, efficient feeding being obtained by addition of Kalmex exothermic compound to the head and rodding. When the castings had cooled the shell moulds were removed and the castings were inspected.

The casting resulting from the uncoated polyurethane foam pattern, had non-metallic inclusions where the skin of the polyurethane pattern had open pores along the parting line and where bruising had occured due to mishandling.

The casting resulting from the polyurethane foam pattern with the coating had no non-metallic inclusions, no parting line defects and reproduced the smooth and the bruised surfaces of the pattern perfectly without mould defects.

Tables 1 and 2 show in detail the measurements taken of the patterns and castings for the uncoated and the coated pattern respectively.

TABLE 1

| Dimension Code | Pattern Size (uncoated) | Casting Size | Difference Pattern/Casting | Contraction % |
| --- | --- | --- | --- | --- |
| 1A | 1.000" | 0.980" | −0.020 | 2.0 |
| 1B | 1.000" | 0.988" | −0.012 | 1.2 |
| 2A | 1.655" | 1.620" | −0.035 | 2.26 |
| 2B | 1.665" | 1.625" | −0.040 | 2.40 |
| 3 | 2.190" | 2.153" | −0.037 | 1.69 |
| 4A | 1.440" | 1.408" | −0.032 | 2.22 |
| 4B | 1.448" | 1.418" | −0.030 | 2.08 |
| 5A | 0.687" | 0.663" | −0.022 | 3.20 |
| 5B | 0.727" | 0.703" | −0.024 | 3.30 |
| 6 | 1.172" | 1.137" | −0.035 | 2.99 |

TABLE 2

| Dimension code | Pattern size (coated—inches) | Casting size (inches) | Difference pattern/casting | Contraction percent | Pattern size (uncoated—inches) | Difference pattern size coated—pattern size uncoated |
| --- | --- | --- | --- | --- | --- | --- |
| A1 | 1.007 | | | | 1.005 | +0.002 |
| A2 | 1.006 | | | | 1.005 | +0.001 |
| B1 | 1.442 | 1.412 | −0.030 | 2.08 | 1.437 | +0.005 |
| B2 | 1.448 | 1.416 | −0.032 | 2.22 | 1.444 | +0.004 |
| C1 | 0.742 | 0.726 | −0.016 | 2.16 | 0.736 | +0.006 |
| C2 | 0.723 | 0.702 | −0.021 | 2.90 | 0.715 | +0.008 |
| D | 1.268 | 1.144 | −0.024 | 2.06 | 1.162 | +0.006 |
| E1 | 1.187 | 1.157 | −0.030 | 2.53 | 1.183 | +0.006 |
| E2 | 1.186 | 1.153 | −0.031 | 2.62 | 1.183 | +0.003 |
| F | 2.262 | 2.208 | −0.054 | 2.38 | 2.256 | +0.006 |
| G | 2.105 | | | | 2.103 | +0.002 |

The last two columns of Table 2 show the dimension of the uncoated pattern corresponding to the dimension of the coated pattern in column 2 and the difference between the two dimensions. The last column indicates the thickness of the two coatings, one coating on each side of the pattern.

It will be noticed that these results show significantly less scatter of the contraction percent for the coated pattern compared with the uncoated pattern which means that the coating of the pattern resulted in increased dimensional reproducibility.

I claim:

1. In a process for the production of a ceramic mould by applying to a pattern of polyurethane foam at least one layer of a ceramic composition comprising a binding agent and a refractory, and thereafter setting, drying and firing the mould, the improvement comprising coating the surface of said pattern to a thickness of from about 0.0002 to about 0.005 inches with a film-forming polymer before applying said ceramic composition, said film-forming polymer being applied to the surface of said pattern as a solution in an inert solvent and said film-forming polymer being selected from the group consisting of a polymer of an ester of acrylic acid, a polymer of an ester of methacrylic acid, a polymer of two or more such esters and a copolymer of such an ester with another mono-ethylenically unsaturated monomer.

2. A process according to claim 1 in which the film-forming polymer is applied by spraying.

3. In a process for the production of a metal casting wherein the molten metal is cast into a ceramic mould and the casting and the mould are allowed to cool, the improvement comprising casting molten metal into a ceramic mould prepared by applying at least one layer of a ceramic composition to a pattern of polyurethane foam which has been coated with a film-forming polymer to a thickness of from about 0.0002 to about 0.005 and said mould then being set, dried and fired, said film-forming polymer being applied to the surface of said pattern as a solution in an inert solvent and said film-forming polymer being selected from the group consisting of a polymer of an ester of acrylic acid, a polymer of an ester of methacrylic acid, a polymer of two or more such esters and a copolymer of such an ester with another mono-ethylenically unsaturated monomer.

* * * * *